T. E. MURRAY, Jr., AND J. B. MURRAY.
METHOD OF ELECTRIC WELDING.
APPLICATION FILED JAN. 15, 1919.
1,329,135. Patented Jan. 27, 1920.
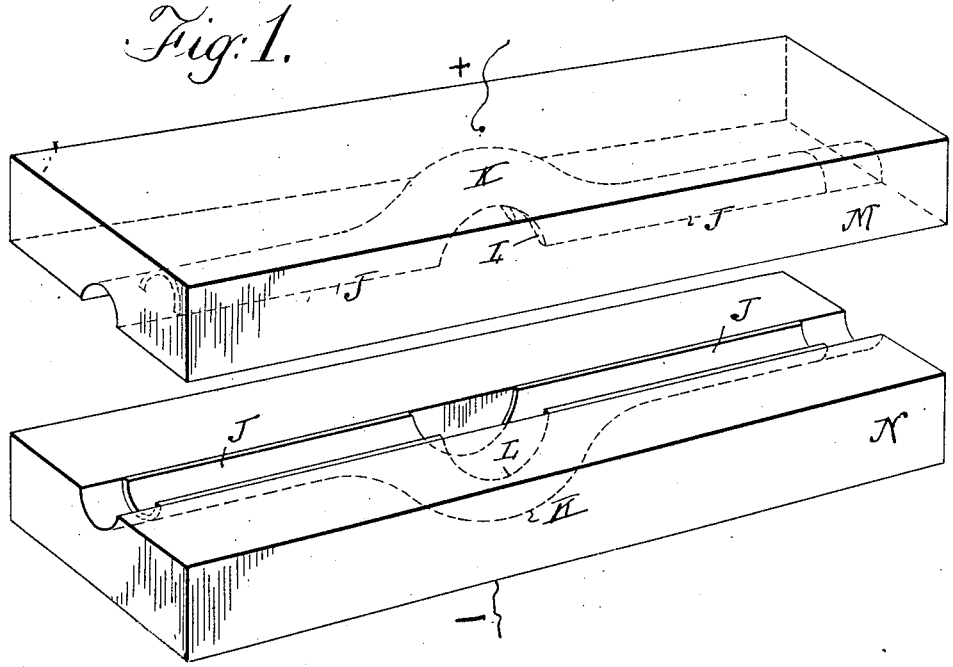
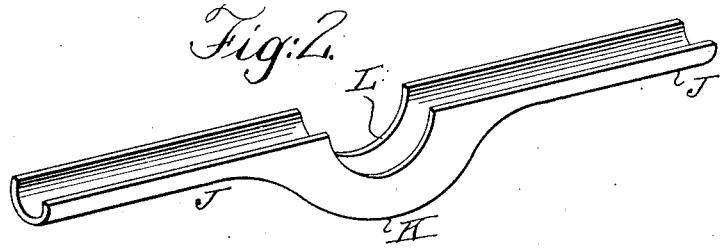
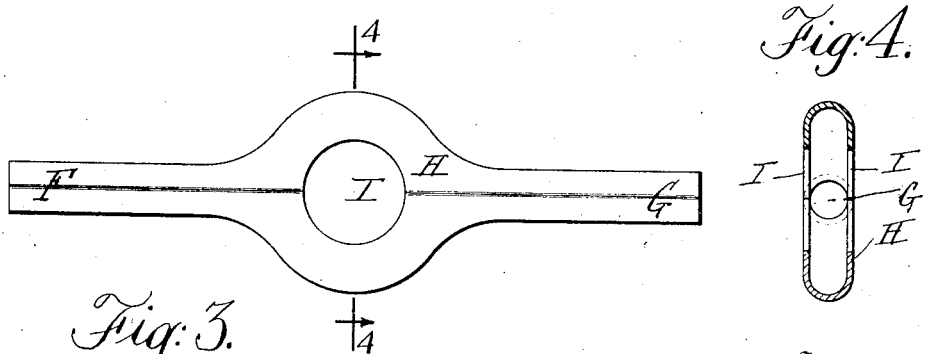

UNITED STATES PATENT OFFICE.

THOMAS E. MURRAY, JR., AND JOSEPH B. MURRAY, OF BROOKLYN, NEW YORK.

METHOD OF ELECTRIC WELDING.

1,329,135.  Specification of Letters Patent.  Patented Jan. 27, 1920.

Application filed January 15, 1919. Serial No. 271,209.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electric Welding, of which the following is a specification.

The problem here solved is to produce by one welding operation a single object formed of two elongated bodies electrically welded together edge to edge, with an opening in the joint. When the two welds respectively on opposite sides of the opening and extending from said opening to the ends of said bodies are made by heat welding—as by the acetylene flame—considerable expenditure of time and skill on the part of the operator is required. In experimenting with the electric welding current applied to the two welds successively, we find that it is virtually impracticable to make them alike, since the similarity is more or less impaired by slight differences in the pressure of the electrodes, by slight variations in the duration and heating effect of the currents producing the respective welds, and by the difficulty of repeating a manually controlled operation in precisely the same way.

Our present invention is a method of producing by electric welding the object aforesaid, wherein said welds are made simultaneously, and in an infinitesimal period of time, and we herein illustrate as such object, a housing for the transmission gear of automobiles, in which, when made in two longitudinal half sections, as hereinafter set forth, it is of obvious importance that neither of the welded joints on opposite sides of the middle opening should be less strong than the other.

In the accompanying drawings—

Figure 1 is a perspective view of the welding electrodes, showing the two longitudinal half sections of said housing seated in recesses therein preparatory to being welded together. Fig. 2 is a perspective view of one of said sections. Fig. 3 is an elevation of the completed housing. Fig. 4 is a cross section on the line 4, 4 of Fig. 3.

The housing, as shown in Fig. 3, is of the type in which two elongated straight tubular end portions F, G are concentric with and extend from opposite sides of a middle enlarged circular portion H having a concentric circular opening I in each of its opposite walls.

We form by stamping or pressing from sheet metal two longitudinal half sections of said housing, as shown in Fig. 2, each section having two elongated straight semi-tubular portions J, J and a middle enlarged semi-circular portion K. In the edges of the walls of said semi-circular portion K we form semi-circular recesses L. The two sections are then seated in correspondingly shaped recesses in the block electrodes M, N, Fig. 1, with their straight edges slightly protruding. When the electrodes are pressed together and the welding current is established, the registering edges of the tubular portions J, J of said sections become united, and thus two straight welded joints are produced simultaneously, which joints are separated by the circular openings I formed by the registering semi-circular recesses L, L and continue to the ends of said tubular portions.

We claim:

The method of making a metal housing for transmission gear, the said housing consisting of two tubular end portions and integral therewith a circular middle portion of greater diameter than said tubular portions, the said middle portion having in its opposite walls circular openings, which consists in forming from a metal blank a longitudinal half section of said housing consisting of two semi-tubular end portions and integral therewith a middle portion of arched form, the opening in said arch being semi-circular, placing a second and similar half section with the straight edges of its semi-tubular portions in registering contact with the straight edges of said first-named half section, and electrically welding together simultaneously the pairs of contacting edge surfaces of said semi-tubular portions.

In testimony whereof we have affixed our signatures in presence of two witnesses.

THOMAS E. MURRAY, JR.
JOSEPH B. MURRAY.

Witnesses:
GERTRUDE T. PORTER,
MAY T. MCGARRY.